(12) United States Patent
Plenderleith

(10) Patent No.: US 11,726,981 B1
(45) Date of Patent: Aug. 15, 2023

(54) DATA INTEGRITY VERIFICATION

(71) Applicant: Amazon Technologies, Inc., Seattle, WA (US)

(72) Inventor: Jamie Plenderleith, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 301 days.

(21) Appl. No.: 17/118,006

(22) Filed: Dec. 10, 2020

(51) Int. Cl.
| | |
|---|---|
| *G06F 16/20* | (2019.01) |
| *G06F 16/23* | (2019.01) |
| *G06F 16/245* | (2019.01) |
| *H04L 9/32* | (2006.01) |
| *H04L 67/10* | (2022.01) |
| *G06F 21/64* | (2013.01) |
| *H04L 9/14* | (2006.01) |

(52) U.S. Cl.
CPC ........ *G06F 16/2365* (2019.01); *G06F 16/245* (2019.01); *G06F 21/64* (2013.01); *H04L 9/14* (2013.01); *H04L 9/3239* (2013.01); *H04L 9/3242* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 2002/0181701 A1* | 12/2002 | Lee | ........................ | H04L 9/3066 380/1 |
| 2003/0126400 A1* | 7/2003 | Debiez | ..................... | G06F 21/64 711/216 |
| 2010/0262828 A1* | 10/2010 | Brown | ....................... | H04L 9/08 713/171 |

\* cited by examiner

*Primary Examiner* — Belix M Ortiz Ditren
(74) *Attorney, Agent, or Firm* — Nicholson De Vos Webster & Elliott LLP

(57) ABSTRACT

Techniques and apparatus for performing integrity verification for data stored on computing systems are described. One technique involves receiving a request to retrieve data from a first data repository. One or more parameters of the request are determined. The data is obtained from the first repository, based on the parameters. Verification information for the data is obtained from a second data repository, based on the parameters. A determination is made as to whether the data obtained from the first data repository has been modified. A message is sent that indicates whether the data obtained from the first data repository has been modified.

20 Claims, 11 Drawing Sheets

DATA INTEGRITY VERIFICATION

BACKGROUND

The present invention relates to cloud computing environments, and more specifically, to techniques for performing integrity verification for data stored in one or more computing systems.

Many different computing systems (e.g., databases, filestores, cloud computing environments, etc.) can store various types of information (or data) for users. In some cases, information that is stored in a computing system for a user may be accessible by other users. For example, an administrator may have access to the information when performing maintenance on the computing system(s) where the information is stored. In another example, a malicious user may gain access to the computing system(s) where the information is stored. In these cases, the user's information may be modified without the user's knowledge.

A user can employ integrity verification techniques to verify that the information stored in a given computing system has not been modified. Certain computing systems, however, may not support integrity verification protocols to verify whether information has been tampered with. For example, the computing system may be a legacy computing system, the computing system may not have sufficient resources to support integrity verification, etc. Adding integrity verification to such computing systems can be significantly complex and time consuming. In addition, maintaining and managing integrity verification on such computing systems can involve a significant amount of resources.

BRIEF DESCRIPTION OF DRAWINGS

Various embodiments in accordance with the present disclosure will be described with reference to the drawings, where like designations denote like elements. Note that the appended drawings illustrate typical embodiments and are therefore not to be considered limiting; other equally effective embodiments are contemplated.

DETAILED DESCRIPTION

Figure 1:
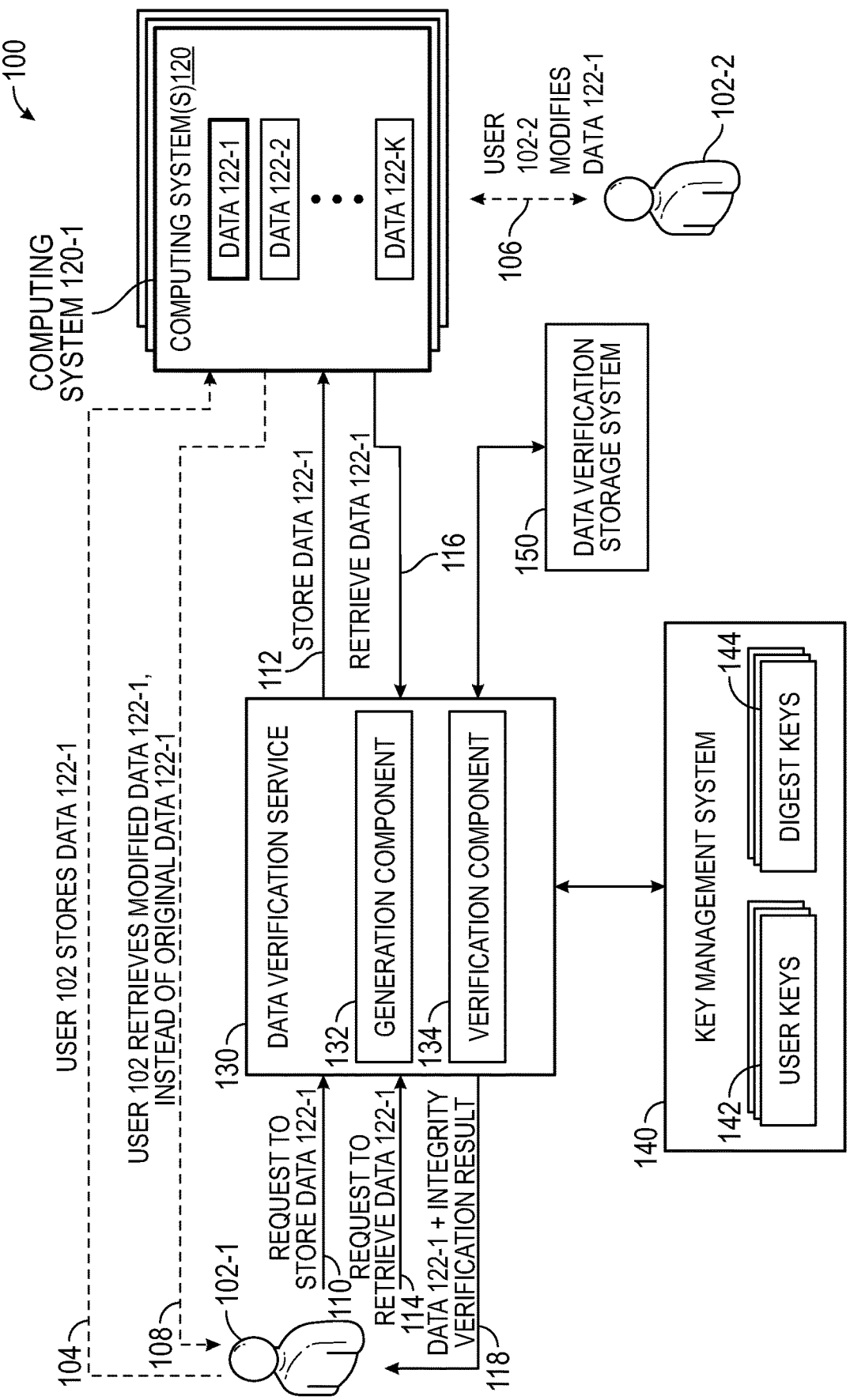
FIG. 1 illustrates an example network architecture for performing integrity verification for one or more computing systems, according to one embodiment.

Embodiments described herein provide techniques and systems for performing integrity verification for one or more computing systems (e.g., databases, filestores, cloud computing storage services, computing systems that include persistent data stores, etc.) used to store information content (or data). In some cases, for example, the computing system(s) may not support integrity verification for content stored on the computing system(s) (e.g., the computing system may be a legacy computing system, the computing system may not have sufficient resources to implement integrity verification, etc.). Additionally, in cases where the computing system(s) support integrity verification, maintaining and managing the integrity verification can be significantly complex and resource intensive. For example, the computing system(s) may not have sufficient resources to proactively perform integrity verification checks, update the message digests, perform key rotation for keyed message digests, etc.

In one embodiment described herein, a data verification service performs and manages integrity verification for stored data on behalf of one or more computing systems and users. The computing system(s) can include any type of system that has an internal data repository or internal persistence mechanism. As described below, the data verification service can store data into a computing system for a user. For example, instead of directly accessing a computing system to store data, a user can send a request for the data verification service to store the data into a particular computing system. Upon receiving the request, the data verification service can generate data verification information for the user's data, store the data verification information in a storage system, and store the user's data into the requested computing system.

In some cases, the data verification information can include one or more message digests associated with the user's data (e.g., one or more hashes of the user's data). As used herein, a "message digest" may also be referred to as a hash, a hash value, a cryptographic hash, etc. The message digest may be generated based on a cryptographic hash function, examples of which include, but are not limited to, versions of message-digest-algorithm (e.g., MD2, MD4, MD5, etc.), versions of secure hash algorithm (e.g., SHA-1, SHA-2, etc.), and the like. In some cases, the data verification information can include one or more keyed message digests (e.g., keyed cryptographic hashes, such as hash message authentication code (HMAC)), digest keys (or security keys) for the keyed message digests, etc., associated with the user's data.

In some embodiments, when the data verification service receives a request for data from the user, the data verification service retrieves the data from the associated computing system, retrieves the data verification information associated with the user's data, and verifies the integrity of the user's data, based on the data verification information. In one embodiment, the data verification service returns the user's data to the user along with an indication of the integrity verification result (e.g., indicating whether the user's data has been modified or tampered with). In another embodiment, when the integrity fails, the data verification service sends an indication to the user that the integrity has failed, but refrains from returning the user's data. In this manner, embodiments provide an efficient mechanism that enables computing systems to support integrity verification of information within the computing systems, e.g., in cases where the computing systems may lack (or have limited) support for integrity verification.

Additionally, in some embodiments, the data verification service provides maintenance support for integrity verification of data within computing systems. In one embodiment described herein, the data verification service can update the data verification information associated with content stored in a computing system, based on one or more criteria (e.g., time based criteria, detected events, etc.). For example, the data verification service can periodically rotate in updated data verification information for the user's information to mitigate against security risks, such as compromised message digest algorithms, etc. In another example, the data verification service can periodically poll (or check) that the user's data has not been modified and can notify the user upon detecting a modification to the user's data. In another example, the data verification service can update data verification information after detecting a predefined event (e.g., an indication of a compromised cryptographic hash algorithm, a security break, out-of-band (or unusual) access to a computing system where the user's data is stored, etc.). In this manner, embodiments can enable computing systems (which lack or have limited support for integrity verification) to update the integrity verification used for information content in the computing systems, e.g., to mitigate against security risks to the information.

Many of the following embodiments are described in the context of a cloud computing environment. A cloud computing environment generally provides users and enterprise customers (e.g., organizations, companies, etc.) with a variety of computing services. For example, an Infrastructure-as-a-Service (IaaS) environment may provision virtual server instances and deploy applications on those instances. In another example, the IaaS environment may provision relational database instances to handle application workloads, backups, storage, etc. In yet another example, the IaaS environment may provision storage infrastructure, networking infrastructure, application services, and development tools.

As used herein, data may also be referred to as content, data content, information, information content, resource(s), etc. Additionally, while many of the following embodiments use an IaaS as a reference example of a cloud computing environment, the techniques presented herein can be used for other types of cloud computing environments, such as Platform-as-a-Service (PaaS) cloud computing environments, Software-as-a-Service (SaaS) cloud computing environments, Desktop-as-a-Service (DaaS) cloud computing environments, Disaster recovery-as-a-Service (DRaaS) cloud computing environments, and so on. In some embodiments, the techniques presented herein can be used in non-cloud computing environments (e.g., where data is stored locally or on-premises).

FIG. 1 illustrates an example network architecture 100 for performing integrity verification for one or more computing systems, according to one embodiment. In one embodiment, the network architecture 100 is representative of a cloud computing environment that hosts multiple cloud computing services for one or more cloud computing users (or customers). As used herein, a cloud computing user (or, in general, a user) may refer to an enterprise, an individual, an organization, etc. Note, however, that the network architecture 100 is merely an example of an environment in which the techniques presented herein can be used. For example, in other embodiments, the techniques presented herein can be implemented in a local or on-premises computing environment where information is stored in one or more computing systems.

Here, the network architecture 100 includes one or more computing systems 120, a data verification service 130, a key management system 140, and a data verification storage system 150, each of which can include software, hardware, or combinations thereof. The computing systems 120 are representative of a variety of storage locations (also referred to as data repositories). For example, the computing systems 120 can include any system that has an internal data repository or internal persistence mechanism. The computing systems 120 can include, but are not limited to, databases, file stores, cloud storage, cloud computing storage services, computing systems or cloud services that include persistence stores for storing information, etc. Although not shown in FIG. 1, one or more of the computing systems 120 can be used by cloud computing services (also referred to as cloud services) that provide various services to users, including, for example, compute resources (e.g., processors, servers, etc.), analytics, networking, mobile, monitoring and reporting metrics for data and resources, logging of events for compliance and auditing, management tools, security, applications, etc. As used herein, a computing system 120 may also be referred to as a storage system, a data repository, a persistent data store, etc.

Each of the computing systems 120 can store information content for users, other computing systems, etc. As shown in FIG. 1, the computing system 120-1 includes data 122-1 to 122-K. The data 122 can include various types of information, including, for example, employment information, financial data, audio files, image (ISO) files, video files, etc. As noted, in some cases, a computing system 120 may lack (or may have limited) support for integrity verification of data that is stored within the computing system 120. For example, the computing system 120 may be a legacy system that may not provide integrity verification, the computing system 120 may not have enough resources to perform integrity verification, the user (e.g., administrator) responsible for managing the computing system 120 may not have sufficient expertise to perform integrity verification, etc.

Due to the lack of integrity verification, a user that stores data in such a computing system may not be able to detect whether the content has been modified from when it was stored. As shown in FIG. 1, for example, assume that user 102-1 accesses computing system 120-1 in order to store data 122-1 (e.g., employment information) in computing system 120-1 (step 104). In this example, another user 102-2 may also access the computing system 120-1 and modify the data 122-1 (step 106). For instance, the user 102-2 may be a designated user (e.g., an administrator, such as a database administrator (DBA)) responsible for maintaining and managing the computing system 120-1 and may have modified the data 122-1 when accessing the computing system 120-1. In another example, the user 102-2 may be a malicious user that modifies the data 122-1 for malicious purposes. In yet another example, the user 102-1 and the user 102-2 can be the same user accessing the data 122-1 in the computing system 120-1.

Continuing with this example, when the user 102-1 accesses the computing system 120-1 to retrieve data 122-1, the user 102-1 obtains a modified version of the data 122-1 instead of the original data 122-1 that was stored (step 108). However, the user 102-1 may not be able to determine that the data 122-1 has been modified, e.g., due to the lack of integrity verification supported by the computing system 120. Moreover, the computing system 120-1 may not have the capability to implement integrity verification, e.g., due to cost, lack of resources, lack of expertise, etc.

As such, embodiments described herein can use the data verification service 130 to perform integrity verification for computing systems 120 (e.g., to verify or validate whether any data 122 stored in the computing systems 120 has been modified or tampered with). The data verification service 130 includes a generation component 132 and a verification component 134, each of which can include hardware, software, or combinations thereof. The generation component 132 and verification component 134 are described in more detail below.

In one embodiment, rather than interacting directly with a computing system 120 to store or retrieve data 122, a user (e.g., user 102-1) can interact with the data verification service 130 to store or retrieve data 122. In this embodiment, the data verification service 130 is configured as a reverse proxy, which stores and retrieves data on behalf of the user 102-1. As shown in FIG. 1, the user 102-1 sends a request to store data 122-1 in a particular computing system (e.g., computing system 120-1) to the data verification service 130 (step 110). As a reference example, the request may be an application programming interface (API) request, which includes a user identifier (ID) (e.g., an identifier associated with user 102), an indication of a target storage location (e.g., computing system 120-1), and a payload (e.g., data 122-1). In some cases, the API request may be a PUT method request or a POST method request.

Upon receiving the request, the data verification service 130 can use the generation component 132 to generate data verification information for the data 122-1 (e.g., message digests, keyed message digests) and store the generated data verification information in the data verification storage system 150. The data verification storage system 150 is generally representative of a variety of storage locations, including, for example, disks, databases, file stores, cloud storage, etc. Although shown as separate from the data verification service 130, in some embodiments, the data verification service 130 can include the data verification storage system 150. In some embodiments, the data verification storage system 150 can be distributed across multiple computing systems. In one embodiment, the data verification storage system 150 is accessible to the data verification service 130, but may not be accessible to other computing systems (e.g., key management system 140, computing systems 120, etc.) and/or users (e.g., users 102-1 and 102-2) in the network architecture 100. In some embodiments, the generation component 132 may choose to store the data verification information in one of the computing systems 120.

In one embodiment, the generation component 132 generates one or more message digests of the data 122-1 and stores the generated message digest(s) in the data verification storage system 150. In another embodiment, the generation component 132 generates one or more keyed message digests of the data 122-1, based on one or more digest keys 144, and stores the keyed message digests along with the keys 144 into the data verification storage system 150. For example, assuming the keyed message digest(s) is a HMAC(s), the digest key(s) 144 may be a secret cryptographic key used to generate the HMAC(s).

In some embodiments, the generation component 132 can retrieve the digest keys 144 from key management system 140. For example, the key management system 140 can store one or more user keys 142, where each user key 142 is uniquely associated with a different user. The user key 142 is generally a private cryptographic key that can be used by the generation component 132 to sign message digests and/or keyed message digests, e.g., to create a digital signature. In some cases, the generation component 132 can request the key management system 140 to generate (or derive) the digest keys 144, based on the user key 142 associated with the user 102-1. In some embodiments, the generation component 132 can obtain a user key 142 and/or a digest key 144 from the key management system 140 that is associated with one or more users or one or more user roles (e.g., as opposed to being uniquely associated with a single user). In these embodiments, the generation component 132 can generate (keyed) message digests of data for one or more users associated with the same user key 142 and/or digest key 144.

As shown in FIG. 1, the data verification service 130 stores the data 122-1 into the requested computing system 120 (step 112). In some embodiments, the data verification service 130 may receive a request from the user 102-1 to retrieve the data 122-1 stored in the computing system 120 (step 116). In one example, the data verification service 130 may receive a GET method API request that specifies the user ID and target location for the data 122-1. Upon receiving the request, the data verification service 130 can use the verification component 134 to retrieve the data 122-1 and verify the integrity of the data 122-1. In one embodiment, the verification component 134 can obtain the data verification information associated with the data 122-1 from the data verification storage system 150 (e.g., based on the user ID in the GET request), and determine whether the data 122-1 has been modified based on the data verification information. For example, the verification component 134 can regenerate the data verification information for the data 122-1 and compare the retrieved data verification information with the generated data verification information to verify that they match. If the verification information matches, then verification component 134 determines that the integrity verification passes. On the other hand, if the verification information does not match, then the verification component 134 determines that the integrity verification fails.

In one embodiment, the data verification service 130 returns the requested data 122-1 to the user 102-1 along with an indication of whether the integrity verification has failed (e.g., an indication of whether the data 122-1 has been modified). In another embodiment, when the verification component 134 determines that the integrity verification has failed, then the data verification service 130 may not return the requested data 122-1 to the user 102-1. In this embodiment, the data verification service 130 can notify the user 102-1 that the integrity verification has failed.

In some embodiments, the data verification service 130 can use the verification component 134 to monitor the status of data 122 stored in the computing systems 120. For example, in one embodiment, the verification component 134 can check the integrity of the data 122 stored in the computing systems 120, based on the data verification information associated with the data 122. The verification component 134 can perform the integrity check when one or more conditions are satisfied. The conditions can include, for example, a predefined time instance, detected event (e.g., indication of a security breach, indication of a compromised cryptographic hash function, etc.). In some embodiments, the verification component 134 can notify the user 102-1, upon determining that data 122 has failed the integrity check.

Additionally or alternatively, the verification component 134 can mitigate against security risks by updating the data verification information for one or more data 122. For example, the verification component 134 can update message digests, update keyed message digests, etc., based on rotated digest keys 144 and/or updated hashing algorithms. In some cases, the verification component 134 can update the data verification information when one or more conditions are satisfied (e.g., predefined time instance, detected event, etc.).

Figure 2:
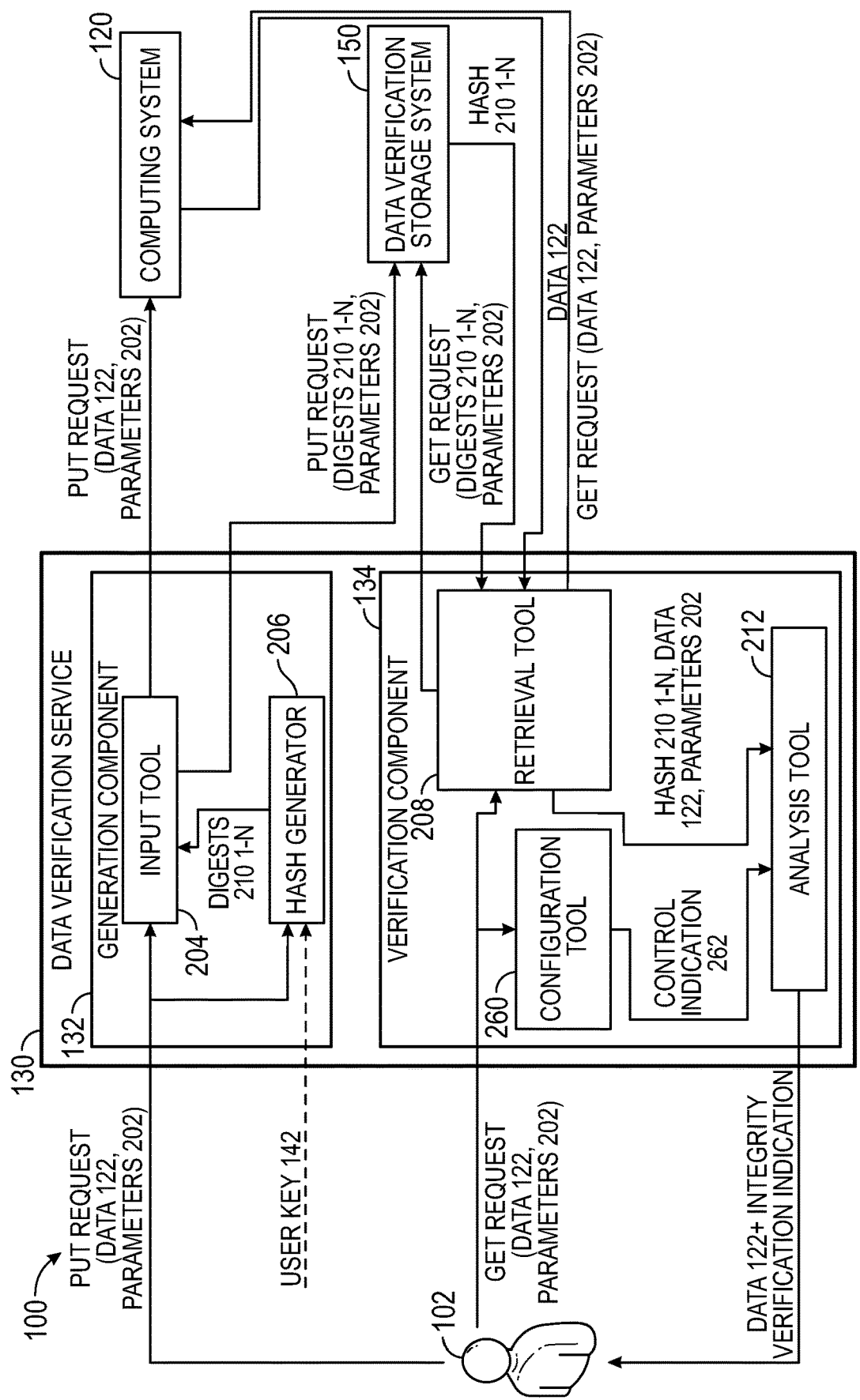
FIG. 2 further illustrates components of the network architecture, described relative to FIG. 1, according to one embodiment.

FIG. 2 further illustrates components of the network architecture 100, described relative to FIG. 1, according to one embodiment. Here, the user 102 submits a PUT request containing data 122 and parameters 202 to the data verification service 130. The PUT request, for example, may be to update the computing system 120 with the data 122. The parameters 202 may include at least one of: a user ID (associated with the user 102), an identifier associated with data 122, an indication of the storage location for the data 122 (e.g., which computing system, such as a database), particular sections of the storage location (e.g., which record in a table, which entries in a database, etc.), configuration information, etc.

In one particular embodiment, assuming the computing system 120 is a cloud service that provides object storage for users, the particular storage location for the data 122 may be indicated via an object key attribute and a value attribute in the PUT request. The object key and value may map to a particular storage object in the computing system 120 where the data 122 is to be stored. In some embodiments, the one or more portions of the computing system 120 may be associated with different user IDs. For example, a first set of storage locations in the computing system 120 may be associated with a first set of user IDs; a second set of storage locations in the computing system 120 may be associated with a second set of user IDs; and so on. In these examples, the object key and value for a particular storage location may also be associated with a particular user ID. The mappings of which user IDs correspond to (e.g., are authorized to access) the storage locations(s) in the computing system 120, which user key 142 (associated with a user ID) is used to sign the message digests 210, etc. may be stored in the data verification service 130 or another location (e.g., data verification storage system 150).

The configuration information can include information regarding how to generate the data verification information (e.g., message digest(s)) for the data in the request, information regarding how to use the data verification information when verifying a (keyed) message digest, etc. For example, the user can indicate, via the configuration information, which hashing algorithm(s) to employ, the number of (keyed) message digests to generate, an indication of different partitions of the data, whether to generate a different (keyed) message digest for the different partitions of the data, the number of (keyed) message digests to verify prior to returning a response to a data retrieval from the user 102, etc.

Once the data verification service 130 receives the PUT request, the data verification service 130 uses the generation component 132 to generate a message digest (e.g., a hash) for the data 122. In one embodiment, the generation component 132 includes an input tool 204 and a hash generator 206. The generation component 132 uses the hash generator 206 to generate one or more message digests 210 1-N of the data 122, based on one or more (e.g., N) hashing algorithms specified in the parameters 202. In this embodiment, for example, the parameters 202 of the PUT request may indicate to generate N message digests of the data 122. The hash generator 206 provides the generated message digests 210 1-N to the input tool 204. In some embodiments, the hash generator 206 can request to use the user key 142 associated with the user 102 in order to sign the message digests 210 1-N. In some examples, the user key 142 may be uniquely associated with the user 102. In other examples, the user key 142 may be uniquely associated with another user, but the user 102 may have a role or permissions to use the user key 142.

The data verification service 130 can use the input tool 204 to send a PUT request to store the data 122 in the computing system 120, based on one or more of the parameters 202 (e.g., target storage location within the computing system 120). For example, as noted, the parameters 202 may be used to identify a unique storage location (e.g., record of a table, entries of a database, file directory, etc.) within a particular computing system 120. Continuing with the example where the computing system 120 is a cloud service that provides object storage for users, the particular storage location may be determined based on the object key attribute and the value attribute in the PUT request. The data verification service 130 can also use the input tool 204 to send a PUT request to store the message digests 210 1-N in the data verification storage system 150, based on one or more of the parameters 202. For example, the message digests 210 1-N may be associated with at least one of the user ID, the storage location of the data 122, etc.

Once the data verification service 130 receives a GET request for the data 122, the data verification service 130 can use the verification component 134 to verify the integrity of the data 122, prior to returning the data 122 to the user 102. In one embodiment, the verification component 134 includes a retrieval tool 208 and an analysis tool 212. Upon receiving the GET request, the retrieval tool 208 sends the GET request for the data 122 to the computing system 120, based on one or more of the parameters 202 (e.g., user ID, indication of target storage location/computing system). The retrieval tool 208 receives the data 122, in response.

In one embodiment, the retrieval tool 208 can determine whether the user 102 is authorized to access the target storage location, based on the user ID in the GET request. For example, the data verification service 130 can store mappings of which user ID(s) are authorized to access different storage locations in the computing system 120 and/or the type of authorized access (e.g., write only, read/write, etc.). Assuming the user 102 were to send the GET request using a user ID that was not allowed to access the target storage location, the data verification service 130 can deny the GET request. On the other hand, assuming the user 102 were to send the GET request using a user ID that was allowed to access the target storage location, the data verification service 130 can allow the GET request.

The retrieval tool 208 also sends a GET request for message digests 210 1-N (e.g., data verification information for the data 122) to the data verification storage system 150, based on one or more of the parameters 202 (e.g., user ID, target storage location, etc.). Continuing with the reference example where the computing system 120 is an object storage cloud service, the message digests 210 1-N for the data 122 can be associated with the object key and value attributes in the parameters 202 that map to a particular target storage location. In this example, the retrieval tool 208 can determine the message digests 210 1-N for the data 122, based on the user ID associated with the target storage location. In response to the GET request, the retrieval tool 208 receives the message digests 210 1-N and sends the retrieved information to the analysis tool 212.

The analysis tool 212 is configured to regenerate the message digests of the data 122, based on the one or more hashing algorithms, and is configured to compare the regenerated message digests with the message digests 210 1-N received from the retrieval tool 208. In one embodiment, the data verification service 130 returns the data 122 along with an indication of the integrity verification result to the user 102 (as shown in FIG. 2). In another embodiment (not shown), the data verification service 130 may not return the data 122 to the user 102, when the integrity verification fails.

In one embodiment, the analysis tool 212 performs the verification operation for each of the message digests 210 1-N (e.g., N times), prior to determining whether to return the data 122 to the user 102. In this embodiment, if the analysis tool 212 determines that at least one regenerated message digest (of the N regenerated message digests) does not match a corresponding message digest received from the retrieval tool 208, then the analysis tool 212 may determine that integrity verification has failed (e.g., indicating that the data 122 has been modified).

In another embodiment, the analysis tool 212 can be configured to perform the regeneration and verification operations for a subset of the message digests 210 1-N, prior to determining whether to return the data 122 to the user 102. For example, the verification component 134 also includes a configuration tool 260, which is configured to send a control indication 262 to the analysis tool 212. The control indication 262 can control how the analysis tool 212 performs the verification operation. For example, the control indication 262 can indicate a number of the message digests 210 that have to be verified prior to returning the data 122 to the user 102, which of the message digests 210 to verify during the verification operation, etc. The configuration tool 260 may provide control indications 262, based on configuration information received from the user 102. For example, as noted above, the parameters 202 in the PUT request can include configuration information from the user 102 indicating how to use data verification information during the verification operation.

In one embodiment, the analysis tool 212 can be configured by a user (via the configuration tool 260) to perform the verification operation for a subset of the message digests when one or more predetermined conditions are satisfied. For example, the predetermined conditions can include certain time periods (or windows, certain events, types of data being accessed, etc. The configuration tool 260 can determine whether the one or more predetermined conditions are satisfied, based in part on the parameters 202 in the GET request (e.g., as shown in FIG. 2). In embodiments where the analysis tool 212 performs the verification for a subset of the message digests 210, the analysis tool 212 can return the data 122 after determining that each of the subset of message digests 210 matches a corresponding regenerated message digest. Depending on the control indication 262, the analysis tool 212 may or may not continue the verification operation in the background for the remaining message digests 210.

Note that the embodiment illustrated in FIG. 2 represents a reference example of an implementation for performing integrity verification of data in a computing system. For example, in other embodiments, the data verification service 130 can be distributed across one or more computing systems. Additionally, in other embodiments, rather than a user submitting a GET request for data to the data verification service 130, the respective computing system 120 can query the data verification service 130 to determine whether the requested data has been tampered with (e.g., upon receiving a GET request for the data).

Figure 3:
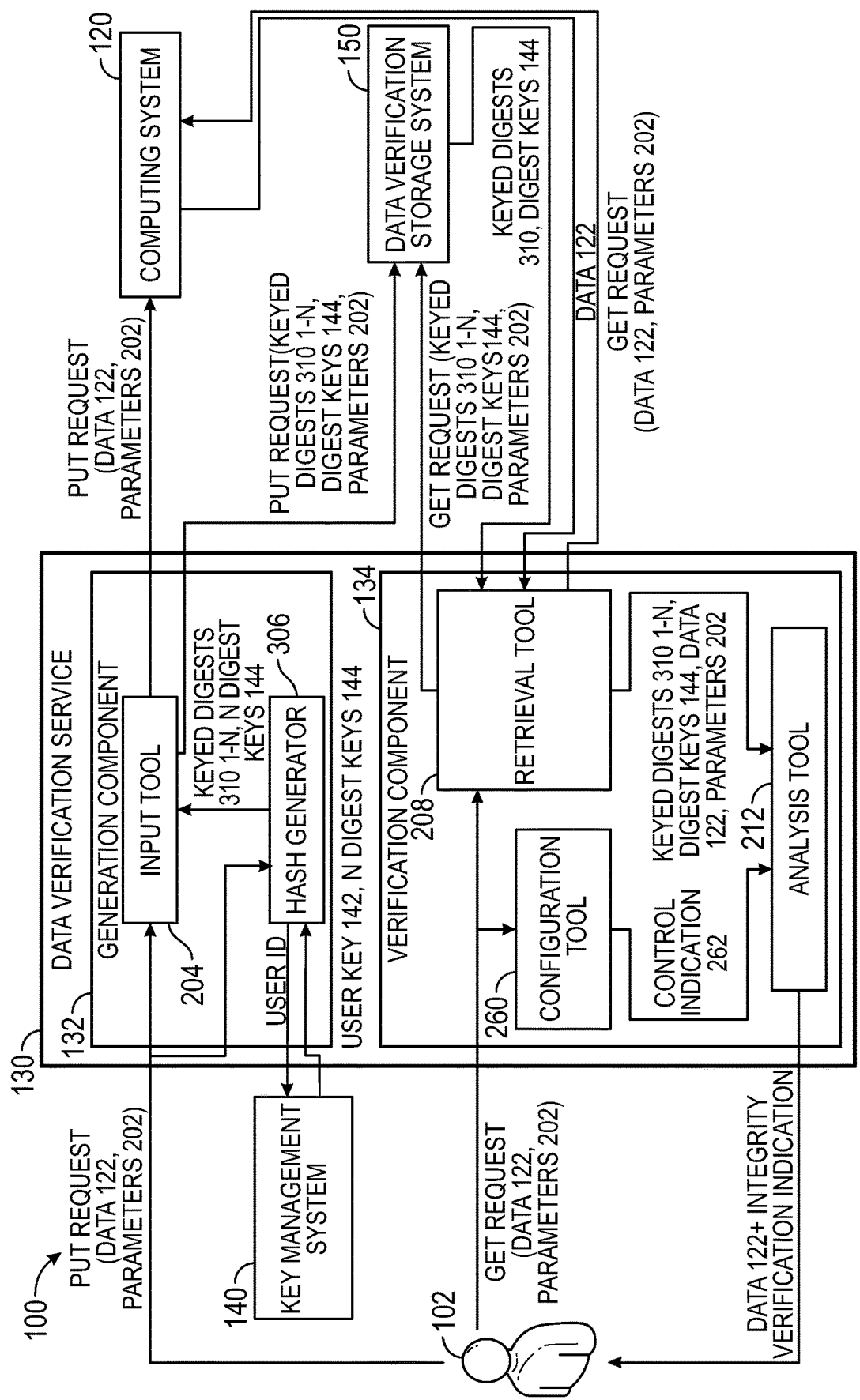
FIG. 3 further illustrates components of the network architecture, described relative to FIG. 1, according to one embodiment.

FIG. 3 further illustrates components of the network architecture 100, described relative to FIG. 1, according to one embodiment. Compared to the network architecture 100 depicted in FIG. 2, here the generation component 132 includes a hash generator 306, which is configured to generate one or more keyed message digests 310 1-N (e.g., N HMACs), based on N digest keys 144 generated by the key management system 140.

For example, the hash generator 306 can determine the user ID from the parameters 202 of the PUT request, and request the generation of N digest keys 144 from the key management system 140 with the user ID. In response, the key management system 140 can derive the N digest keys 144 based on the user key 142 associated with the user ID and return the user key 142 and the N digest keys 144. In one embodiment, the hash generator 306 can sign the keyed message digests with the user key 142. Note that in cases where a user 102 is onboarding to the data verification service, the user 102 may not have a user ID. In these cases, the data verification service 130 may request the key management system 140 to generate a user key 142 that can be used to generate the keyed message digests 310.

The generation component 132 sends the keyed message digests 310 and the digest keys 144 to the input tool 204, which is configured to (i) store the keyed message digests 310 and the digest keys 144 in the data verification storage system 150, based on the parameters 202 (e.g., user ID, object key, and value in the PUT request), and (ii) store the data 122 into the computing system 120, based on the parameters 202 (e.g., user ID, object key, and value in the PUT request). The data verification service 130 (via the generation component 132) can store an indication (or mapping) of the digest keys 144 that are associated with the user ID, which digest keys 144 are used to generate the keyed digests 310, which user key 142 associated with a user ID is used to sign the keyed digests 310, etc. This information may be stored in the data verification service 130 or another location (e.g., data verification storage system 150).

Similar to FIG. 2, upon receiving a GET request for the data, the verification component 134 sends a GET request for the keyed message digests 310 and digest keys 144 to the data verification storage system 150, and receives the keyed message digests 310 and digest keys 144, in response. The verification component 134 can determine the data verification information that corresponds to the data, based on one or more parameters 202 of the GET request (e.g., user ID). For example, the verification component 134 can retrieve (from storage) an indication of which digest keys 144 and keyed message digests 310 are associated with the user ID in the GET request. The verification component 134 also sends a GET request for the data 122, and receives the data 122 in response.

The verification component 134 uses the analysis tool 212 to regenerate the keyed message digests and compare the regenerated keyed message digests with the keyed message digests received from the data verification storage system 150. Similar to FIG. 2, in one embodiment, the analysis tool 212 can perform the verification for each of the keyed message digests 310, prior to determining whether to return the data 122 to the user 102. In another embodiment, the analysis tool 212 can perform the verification for a subset of the keyed message digests 310, prior to determining whether to return the data 122 to the user 102. The analysis tool 212 can perform the verification of the keyed message digests 310, based on the control indication 262 received from the configuration tool 260.

In some embodiments, the keyed message digests 310 1-N may be used for verifying the integrity of different portions (or partitions) of the data 122. In some cases, for example, a first keyed message digest 310-1 can be used to verify the integrity of a first portion of the data 122, a second keyed message digest 310-2 can be used to verify the integrity of a second portion of the data 122, and so on. The user 102 may specify the particular cryptographic hash functions to use for the respective data portions in the parameters 202, which may be sent to the configuration tool 260.

Figure 4:
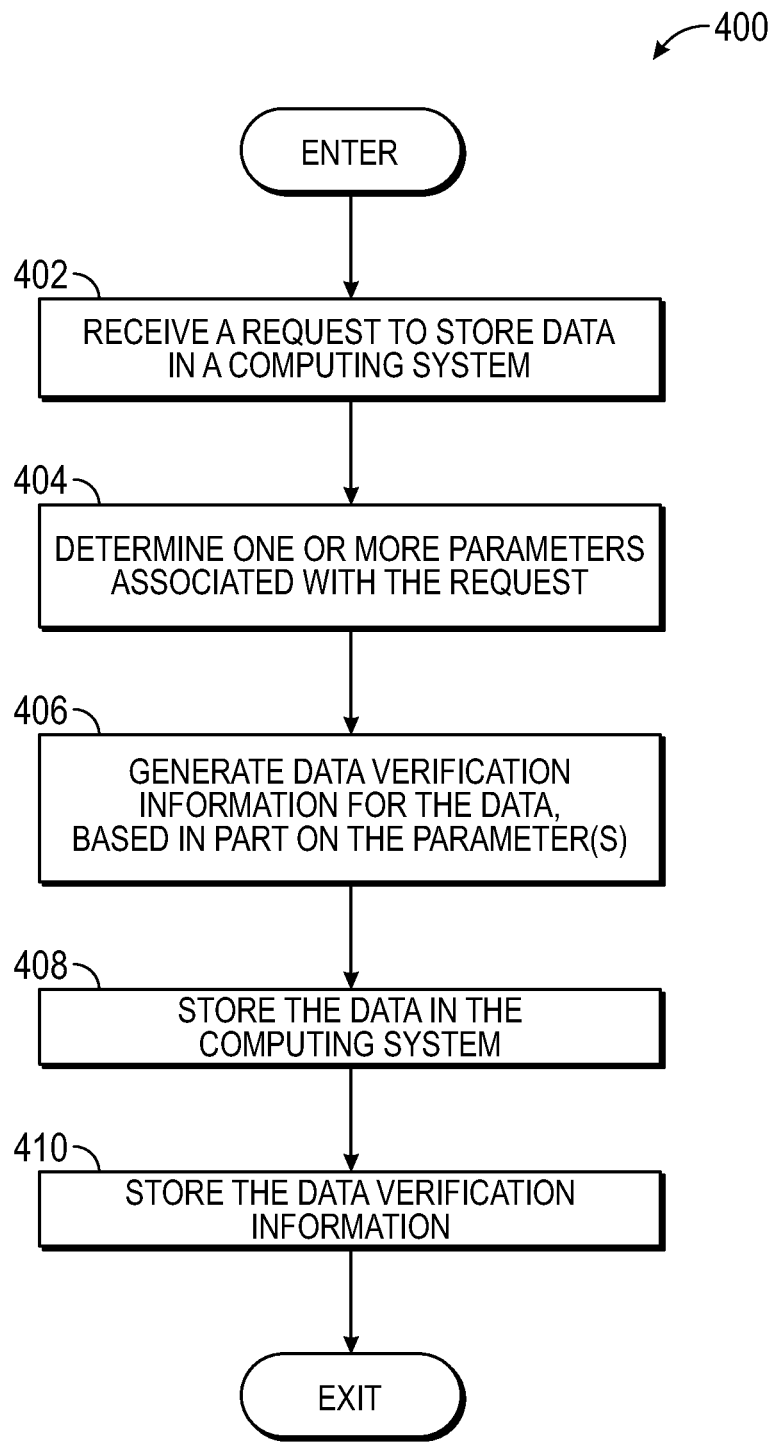
FIG. 4 is a flowchart of a method for generating data verification information for data to be stored in a computing system, according to one embodiment.

FIG. 4 is a flowchart of a method 400 for generating data verification information for data to be stored in a computing system, according to one embodiment. The method 400 may be performed by one or more components of a data verification service (e.g., data verification service 130).

Method 400 may enter at block 402, where the data verification service receives a request (e.g., PUT request) to store data (e.g., data 122) in a computing system (e.g., computing system 120). At block 404, the data verification service determines parameter(s) (e.g., parameters 202) associated with the request.

At block 406, the data verification service generates data verification information for the data, based in part on the parameter(s). In one embodiment, the data verification information includes one or more message digests (e.g., message digests 210). In another embodiment, the data verification information includes one or more keyed message digests (e.g., keyed message digests 310) and one or more N digest keys (e.g., N digest keys 144).

At block 408, the data verification service stores the data in the computing system, e.g., based on the parameters. At block 410, the data verification service stores the data verification information. In one embodiment, the data verification information can be stored in a storage location (e.g., data verification storage system 150) accessible to the data verification service, but not accessible to other computing systems.

Figure 5:
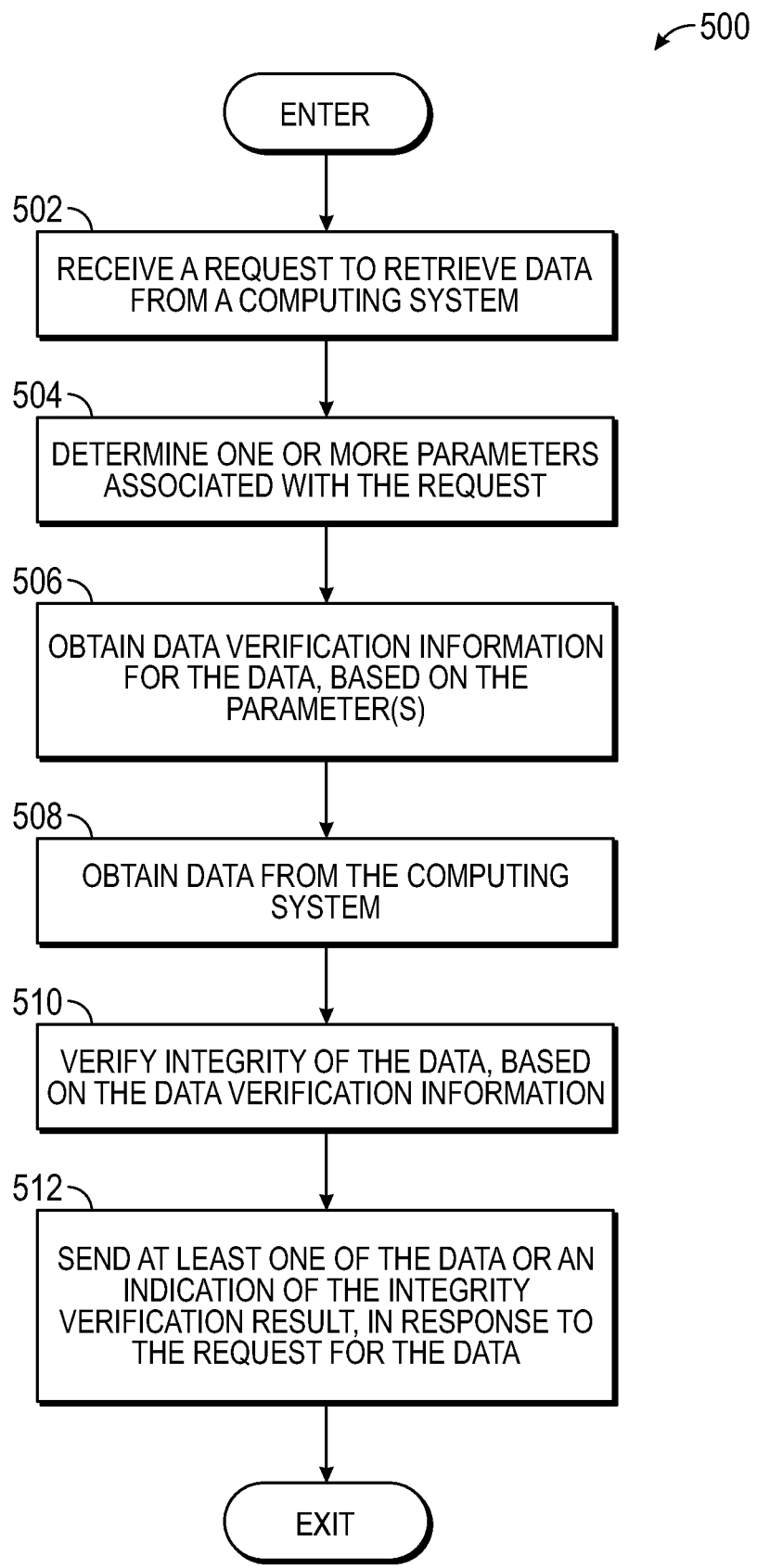
FIG. 5 is a flowchart of a method for verifying integrity of data retrieved from a computing system, according to one embodiment.

FIG. 5 is a flowchart of a method 500 for verifying integrity of data retrieved from a computing system, according to one embodiment. The method 500 may be performed by one or more components of a data verification service (e.g., data verification service 130).

Method 500 may enter at block 502, where the data verification service receives a request to retrieve data (e.g., data 122) from a computing system (e.g., computing system 120). At block 504, the data verification service determines parameter(s) (e.g., parameters 202) associated with the request.

At block 506, the data verification service obtains data verification information for the data, based on the parameters. For example, the data verification service can send a GET request (including the parameters) for the data to a storage location (e.g., data verification storage system 150) where the data is stored. In one embodiment, the data verification service can determine which data verification information corresponds to the data, based on a user ID in the parameters. In one embodiment, the data verification information includes one or more message digests (e.g., message digests 210). In another embodiment, the data verification information includes one or more keyed message digests (e.g., keyed message digests 310) and one or more N digest keys (e.g., N digest keys 144). At block 508, the data verification service obtains data from the computing system, e.g., using another GET request with the parameters.

At block 510, the data verification service verifies the integrity of the data, based on the data verification information. In one example, the data verification service can regenerate one or more message digests of the data, based on the hashing algorithms indicated in the parameters and the data obtained from the computing system. The data verification service can compare the regenerated message digests with the obtained message digests obtained to determine whether they match. At block 512, the data verification service sends at least one of the data or an indication of the integrity verification result, in response to the request for retrieving the data. For example, in one embodiment, the data verification service can refrain from returning the data upon determining that at least one of the (keyed) message digests in the data verification information fails to match a corresponding regenerated (keyed) message digest.

Figure 6:
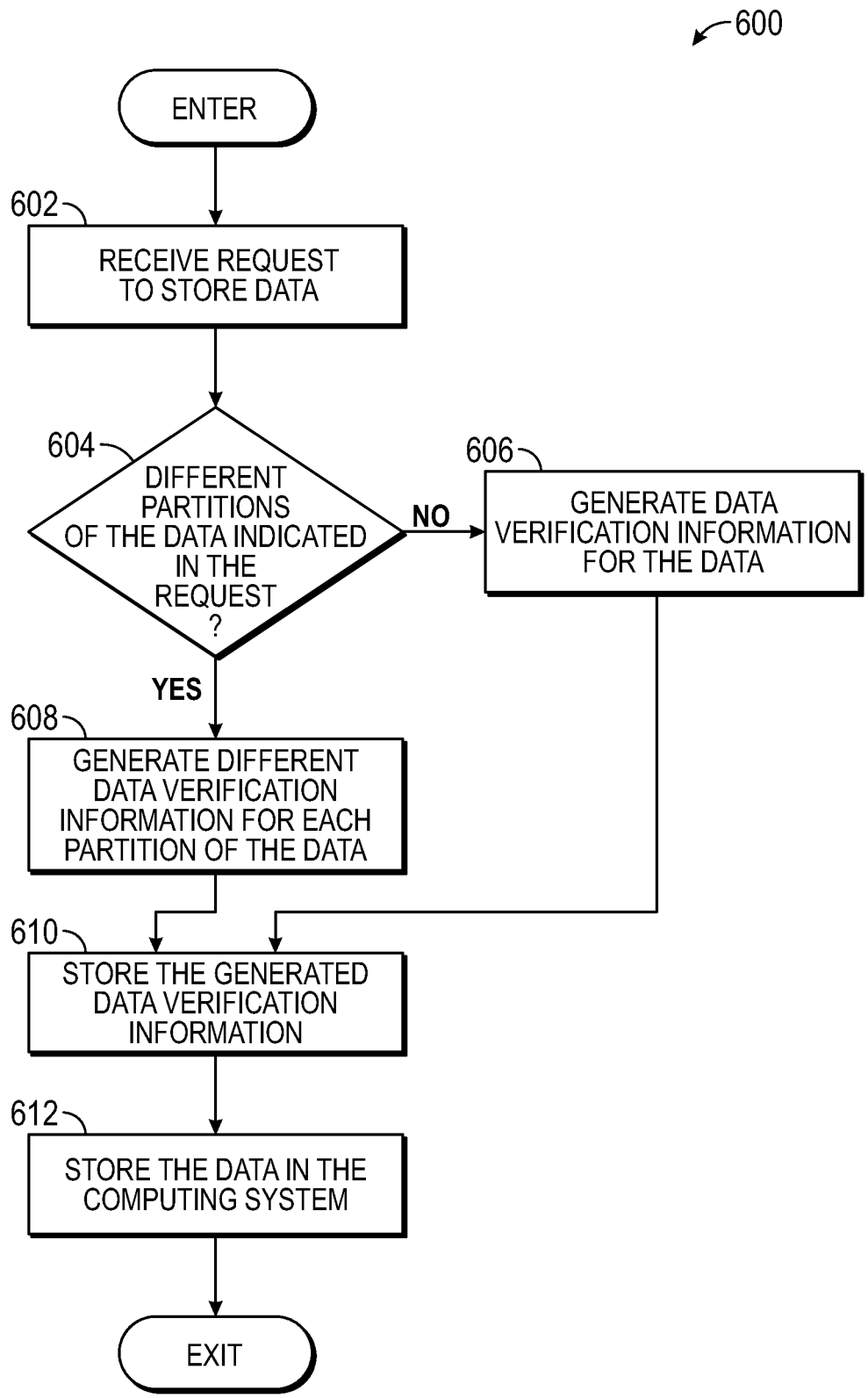
FIG. 6 is a flowchart of another method for generating data verification information for data to be stored in a computing system, according to one embodiment.

FIG. 6 is a flowchart of another method 600 for generating data verification information for data to be stored in a computing system, according to one embodiment. The method 600 may be performed by one or more components of a data verification service (e.g., data verification service 130).

Method 600 may enter at block 602, where the data verification service receives a request (e.g., PUT request) to store data (e.g., data 122) in a computing system (e.g., computing system 120). At block 604, the data verification service determines whether different partitions (or portions) of the data are indicated in the request. For example, the parameter(s) (e.g., parameters 202) of the request can indicate whether the user is indicating to generate a message digest (e.g., message digest 210) or keyed message digest (e.g., keyed message digest 310) for each different partition of the data for storage.

If the data verification service determines that different partitions of the data are indicated in the request, then the data verification service generates different data verification information (e.g., message digest, keyed message digest, etc.) for each partition of the data (block 608). On the other hand, if the data verification service determines that different partitions of the data are not indicated in the request, then the data verification service generates a single data verification information (e.g., a single message digest, a single keyed message digest, etc.) for the data (block 606). In some embodiments, the data verification service can generate a first set of data verification information for the entire data and one or more second sets of data verification, each corresponding to different partitions of the data. At block 610, the data verification service stores the generated data verification information. At block 612, the data verification service stores the data in the computing system.

Figure 7:
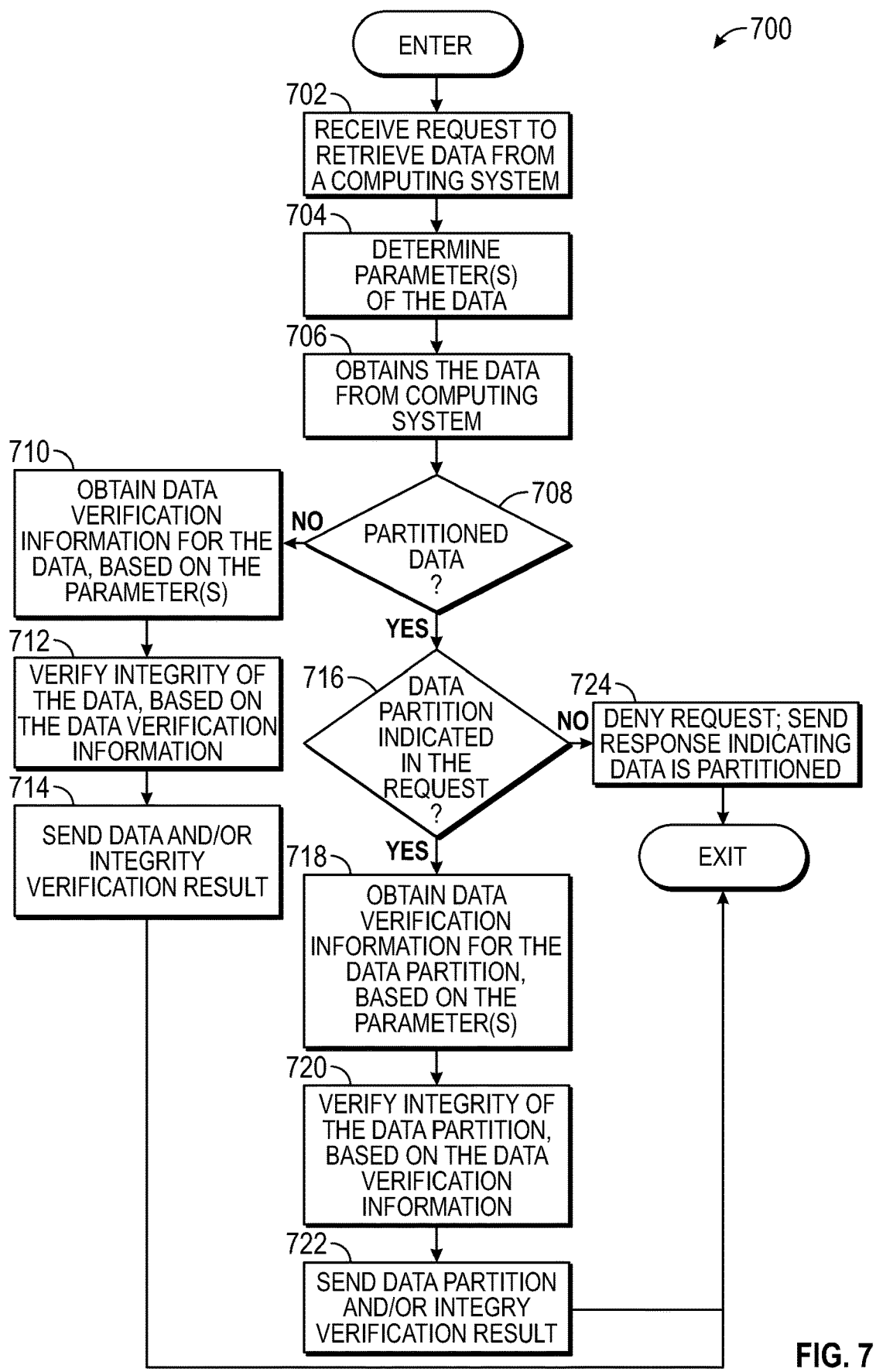
FIG. 7 is a flowchart of another method for verifying integrity of data retrieved from a computing system, according to one embodiment, according to one embodiment.

FIG. 7 is a flowchart of another method 700 for verifying integrity of data retrieved from a computing system, according to one embodiment, according to one embodiment. The method 700 may be performed by one or more components of a data verification service (e.g., data verification service 130).

Method 700 may enter at block 702, where the data verification service receives a request to retrieve data (e.g., data 122) from a computing system (e.g., computing system 120). At block 704, the data verification service determines parameter(s) (e.g., parameters 202) associated with the request. At block 706, the data verification service obtains the data from the computing system, e.g., based on the parameters.

At block 708, the data verification service determines whether the data has one or more partitions. If so, then the data verification service determines whether the request (in block 702) indicates one of the partitions (block 716). If a data partition is not indicated, then the data verification service denies the request and sends a response indicating data is partitioned (block 724). The method 700 may then exit.

On the other hand, if the data verification service determines that a data partition is indicated in the request, then the data verification service obtains data verification information (e.g., message digests 210, keyed message digests 310, digest keys 144, etc.) for the data partition, based on the parameters (block 718). At block 720, the data verification service verifies the integrity of the data partition, based on the data verification information. At block 722, the data verification service sends the data and/or the integrity verification result, in response to the request.

If, at block 708, the data verification service determines that the data is not partitioned, then the data verification service obtains data verification information for the data, based on the parameters (block 710). At block 712, the data verification service verifies integrity of the data, based on the data verification information. At block 714, the data verification service sends the data and/or the integrity verification result. The method 700 may then exit.

Figure 8:
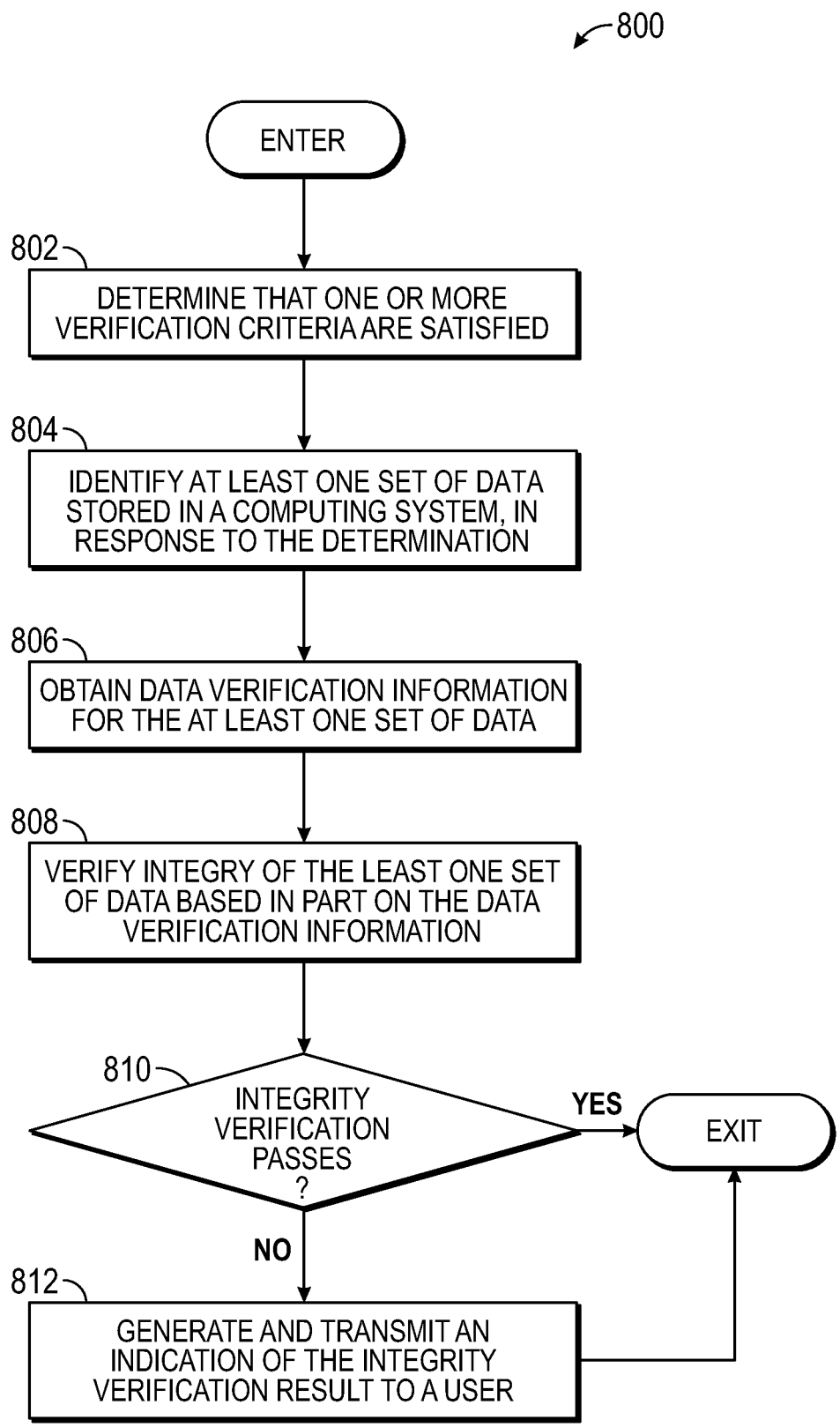
FIG. 8 is a flowchart of a method for verifying integrity of data in a computing system, according to one embodiment.

FIG. 8 is a flowchart of a method 800 for verifying integrity of data in a computing system, according to one embodiment. The method 800 may be performed by one or more components of a data verification service (e.g., data verification service 130).

Method 800 may enter at block 802, where the data verification service determines that one or more verification criteria are satisfied. For example, the data verification service may determine that a predefined time interval has occurred, may detect a predefined event (e.g., detection of a security breach), etc. At block 804, in response to the determination, the data verification service identifies at least one set of data (e.g., data 122) stored in a computing system (e.g., computing system 120). At block 806, the data verification service obtains data verification information for the at least one set of data.

At block 808, the data verification service verifies the integrity of the at least one set of data, based in part on the data verification information. At block 810, the data verification service determines whether integrity verification has passed. If so, the method 800 exits. If not, then the data verification service generates and transmits an indication of the integrity verification result to a user (block 812). For example, at block 812, the data verification service can proactively notify the user that the user's data has been modified or tampered with, e.g., without the user having to send a GET request for the data.

Figure 9:
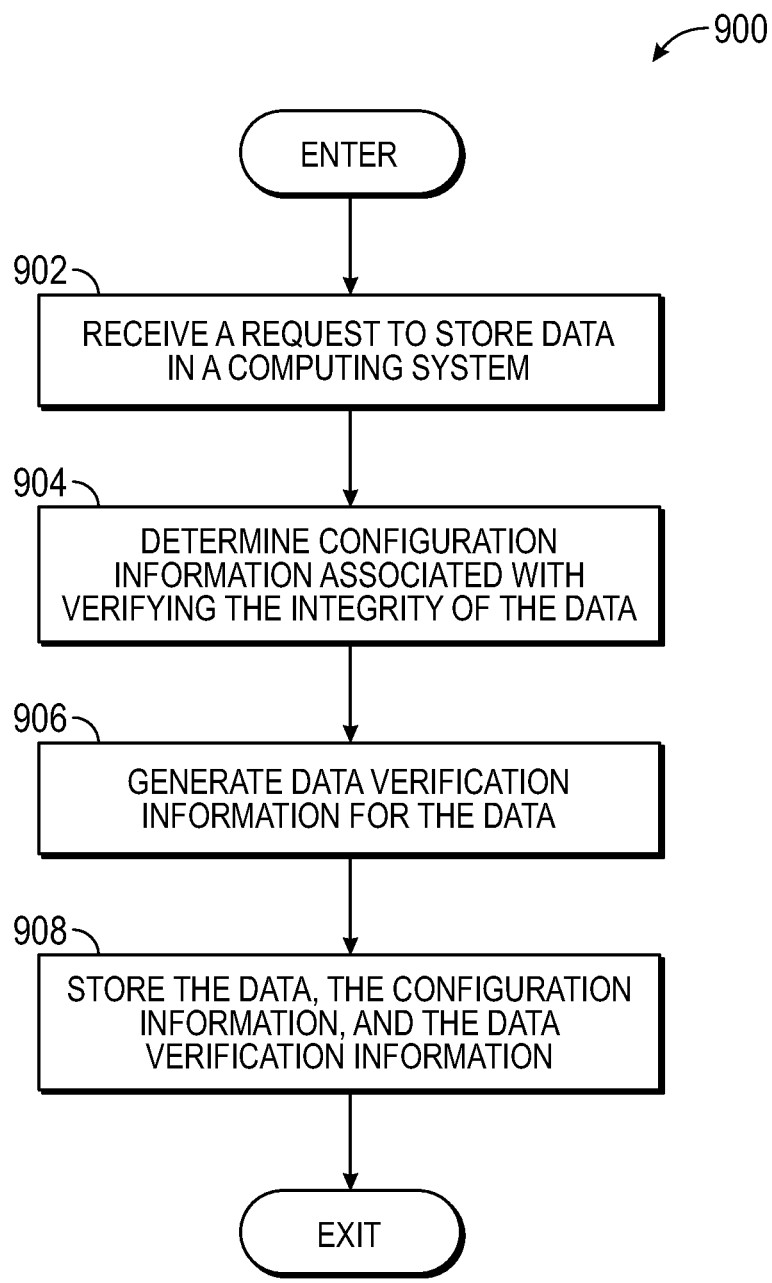
FIG. 9 is a flowchart of another method for generating data verification information for data to be stored in a computing system, according to one embodiment.

FIG. 9 is a flowchart of a method 900 for generating data verification information for data to be stored in a computing system, according to one embodiment. The method 900 may be performed by one or more components of a data verification service (e.g., data verification service 130).

Method 900 may enter at block 902, where the data verification service receives a request (e.g., PUT request) to store data (e.g., data 122) in a computing system (e.g., computing system 120). At block 904, the data verification service determines configuration information associated with verifying the integrity of the data. For example, as noted above, the parameters (e.g., parameters 202) of the request can include configuration information indicating how the data verification service is to use the data verification information generated by the data verification service.

In some examples, the configuration information can specify that a subset of the data verification information (as opposed to all of the data verification information) can be verified prior to returning data in response to a request to retrieve the data (e.g., a GET request). In some examples, the configuration information can specify which subset of the data verification information (e.g., which message digests, which keyed message digests, etc. 0 to verify prior to returning the data. In some examples, the configuration information can specify that a subset of the data verification information can be verified when certain condition(s) are satisfied. The condition(s) can include, for example, a predetermined time instance, a particular event, the type of the data, etc.

At block 906, the data verification service generates the data verification information. At block 908, the data verification stores the configuration information, the data verification information, and the data. The data, for example, may be stored in the computing system, the data verification information may be stored in the data verification storage system 150, and the configuration information may be stored in the data verification service. The method 900 may then exit.

Figure 10:
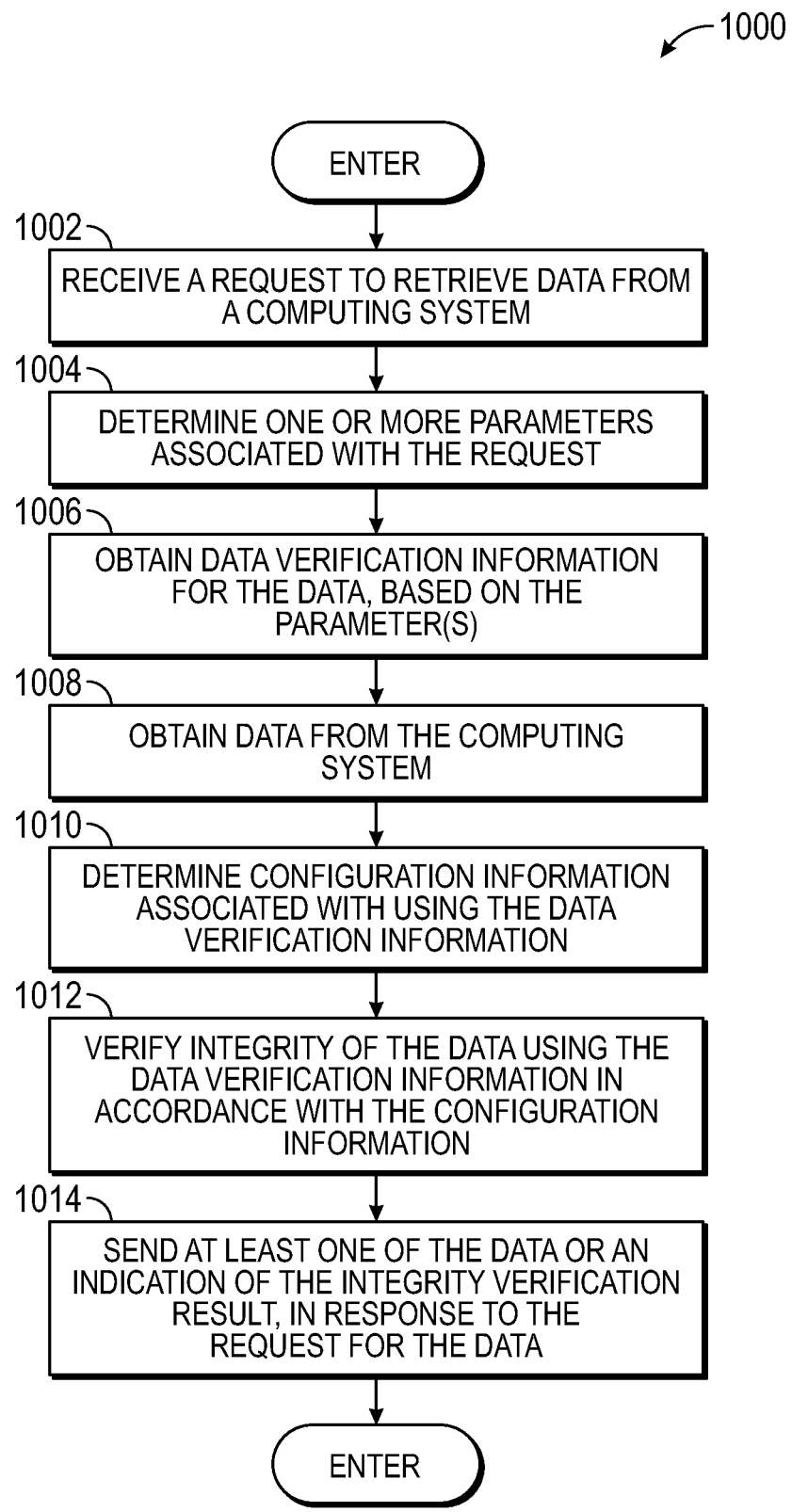
FIG. 10 is a flowchart of another method for verifying integrity of data in a computing system, according to one embodiment.

FIG. 10 is a flowchart of a method 1000 for verifying integrity of data in a computing system, according to one embodiment. The method 1000 may be performed by one or more components of a data verification service (e.g., data verification service 130).

Method 1000 may enter at block 1002 where the data verification service receives a request (e.g., GET request) to retrieve data (e.g., data 122) from a computing system (e.g., computing system 120). At block 1004, the data verification service determines parameter(s) (e.g., parameters 202) associated with the request. The parameter(s), for example, can include at least one of a user ID or storage location.

At block 1006, the data verification service obtains data verification information for the data, based on the parameters. At block 1008, the data verification service obtains the data, based on the parameters. At block 1010, the data verification service determines configuration information associated with using the data verification information. In some embodiments, the data verification service can retrieve the configuration information from a storage location (e.g., within the data verification service or elsewhere) based on one or more of the parameters. For example, the data verification service may have stored the configuration information in associated with user ID (e.g., when a PUT request for the data was received by the data verification service).

The configuration information may indicate how the data verification service is to use the data verification information obtained by the data verification service to verify the integrity of the data obtained from the computing system. For example, as noted above, the configuration information can specify that a subset of the data verification information (as opposed to all of the data verification information) can be verified prior to returning data in response to a request to retrieve the data (e.g., a GET request). In some examples, the configuration information can specify which subset of the data verification information (e.g., which message digests, which keyed message digests, etc. to verify prior to returning the data. In some examples, the configuration information can specify that a subset of the data verification information can be verified when certain condition(s) are satisfied. The condition(s) can include, for example, a predetermined time instance, a particular event, the type of the data, etc.

At block 1012, the data verification service verifies the integrity of the data using the data verification information according to the configuration information. In one example, the data verification service can regenerate a subset of one or more message digests of the data, based on the hashing algorithms indicated in the parameters and the data obtained from the computing system. The data verification service can compare the regenerated message digests with the obtained message digests obtained to determine whether they match.

At block 1014, the data verification service can return at least one of the data or the integrity verification result. Here, if the data verification service determines that each of the subset of message digests matches a corresponding regenerated message digest, then the data verification service can return the data (at block 1014), prior to completing the verification for the remaining message digests. In some embodiments, the data verification service can continue to verify the remaining message digests in the background, after returning the data to ensure that the data has not been tampered with. On the other hand, if the data verification service determines that at least one of the subset of the message digests fails verification, then the data verification service can refrain from returning the data (at block 1014), but may indicate that at least one of the message digests has failed the integrity verification. The method 1000 may then exit.

Figure 11:
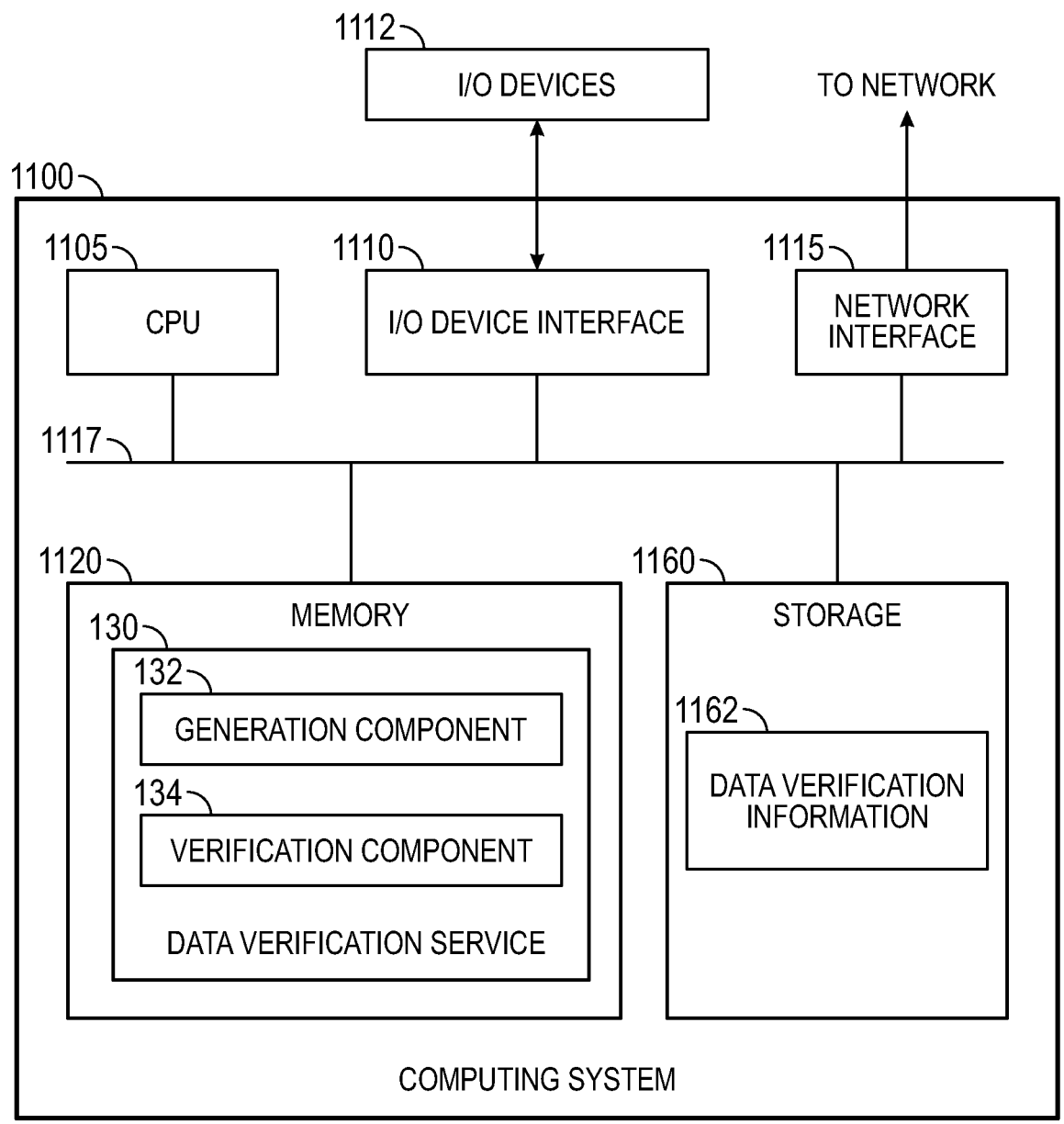
FIG. 11 illustrates an example computing system configured to perform integrity verification of data for one or more computing systems, according to one embodiment.

FIG. 11 illustrates a computing system 1100 configured to perform integrity verification of data for one or more computing systems, according to one embodiment. As shown, the computing system 1100 includes, without limitation, a central processing unit (CPU) 1105, a network interface 1115, a memory 1120, and storage 1160, each connected to a bus 1117. The computing system 1100 may also include an I/O device interface 1110 connecting I/O devices 1112 (e.g., keyboard, mouse, and display devices) to the computing system 1100. Further, in context of this disclosure, the computing elements shown in the computing system 1100 may correspond to a physical computing system (e.g., a system in a data center) or may be a virtual computing instance executing within a computing cloud.

The CPU 1105 retrieves and executes programming instructions stored in the memory 1120 as well as stores and retrieves application data residing in the memory 920. The interconnect 1117 is used to transmit programming instructions and application data between CPU 1105, I/O devices interface 1110, storage 1160, network interface 1115, and memory 1120. Note CPU 1105 is included to be representative of a single CPU, multiple CPUs, a single CPU having multiple processing cores, and the like. Memory 1120 is generally included to be representative of a random access memory. The storage 1160 may be a disk drive storage device. Although shown as a single unit, storage 1160 may be a combination of fixed and/or removable storage devices, such as fixed disc drives, removable memory cards, or optical storage, network attached storage (NAS), or a storage area-network (SAN). The storage 1160 includes data verification information 1162, which can include message digests 210, keyed message digests 310, digest keys 144, etc. Illustratively, the memory 1120 includes the data verification service 130, which includes generation component 132 and verification component 134, which are described in more detail above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., data verification service 130) or related data (e.g., data verification storage system 150) in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium storing instructions, which, when executed on one or more computing systems, perform an operation for verifying integrity of data stored in a first data repository, the operation comprising:

obtaining, at a cloud computing service, a first request from a user to store first data in the first data repository, wherein the first data repository lacks support for performing integrity verification of data stored in the first data repository;

determining, by the cloud computing service, a plurality of cryptographic hash algorithms, based on one or more parameters of the first request;

generating, by the cloud computing service, a first plurality of message digests of the first data, based on the plurality of cryptographic hash algorithms, wherein each of the first plurality of message digests is generated based on a different one of the plurality of cryptographic hash algorithms;

sending, by the cloud computing service, a second request to store the first data in the first data repository;

sending, by the cloud computing service, a third request to store the first plurality of message digests in a second data repository;

receiving, by the cloud computing service, a fourth request from the user to retrieve the first data from the first data repository;

obtaining, by the cloud computing service, the first plurality of message digests from the second data repository, based on one or more parameters of the fourth request;

determining, by the cloud computing service, whether the first data has been altered, based in part on the first plurality of message digests; and sending, by the cloud computing service, a message comprising an indication of the determination of whether the first data has been altered, in response to the fourth request.

2. The non-transitory computer-readable medium of claim 1, the operation further comprising upon determining that the first data has been altered, sending an indication to the user that the fourth request is denied.

3. The non-transitory computer-readable medium of claim 1, the operation further comprising obtaining, by the cloud computing service, the first data from the first data repository, based on one or more parameters of the fourth request.

4. The non-transitory computer-readable medium of claim 3, wherein determining whether the first data has been altered comprises:

generating a second plurality of message digests of the first data obtained from the first data repository, based on the plurality of cryptographic hash algorithms; and determining whether at least one of the second plurality of message digests does not match a corresponding one of the first plurality of message digests.

5. The non-transitory computer-readable medium of claim 3, the operation further comprising sending, by the cloud computing service, the first data obtained from the first data repository.

6. The non-transitory computer-readable medium of claim 1, wherein each message digest is generated based on a different one of the plurality of cryptographic hash algorithms applied to a different portion of the first data.

7. The non-transitory computer-readable medium of claim 6, wherein the one or more parameters of the first request comprises at least one of: (i) an indication of a number of the plurality of cryptographic hash algorithms or (ii) an indication of which of the plurality of cryptographic hash algorithms to apply to the different portions of the first data.

8. A computer-implemented method comprising:

receiving a request to retrieve data from a first data repository, wherein the first data repository lacks support for performing integrity verification of data stored in the first data repository;

determining one or more parameters of the request;

obtaining the data from the first data repository, based on the one or more parameters of the request;

obtaining verification information for the data from a second data repository, based on the one or more parameters of the request;

determining whether the data obtained from the first data repository has been modified, based on the verification information obtained from the second data repository; and sending a message comprising an indication of whether the data obtained from the first data repository has been modified.

9. The computer-implemented method of claim 8, wherein the one or more parameters comprises an indication of a user identifier and a storage location in the first data repository for the data.

10. The computer-implemented method of claim 9, wherein the verification information comprises one or more message digests generated based on one or more cryptographic hash algorithms associated with the user identifier.

11. The computer-implemented method of claim 9, wherein:

the verification information comprises one or more keyed message digests and one or more digest keys; and the one or more digest keys are associated with the user identifier.

12. The computer-implemented method of claim 9, wherein the verification information comprises a plurality of message digests, each of the message digests being generated based on a different cryptographic hash applied to the data.

13. The computer-implemented method of claim 8, further comprising determining configuration information associated with the verification information, the configuration information indicating how to use the verification information to determine whether the data obtained from the first data repository has been modified.

14. The computer-implemented method of claim 8, further comprising upon determining that one or more criteria is satisfied, performing an integrity check of the data in the first data repository.

15. The computer-implemented method of claim 14, wherein the one or more criteria comprise detection of a predefined event or occurrence of a predefined time interval.

16. The computer-implemented method of claim 14, further comprising triggering an alert upon determining that the integrity check of the data has failed.

17. A computing system, comprising:

one or more processors; and a memory containing program code that, when executed by operation of the one or more processors, performs an operation comprising:

receiving a request to retrieve data from a first data repository, wherein the first data repository lacks support for performing integrity verification of data stored in the first data repository;

determining one or more parameters of the request;

obtaining the data from the first data repository, based on the one or more parameters of the request;

obtaining verification information for the data from a second data repository, based on the one or more parameters of the request;

determining whether the data obtained from the first data repository has been modified, based on the verification information obtained from the second data repository; and sending a message comprising an indication of whether the data obtained from the first data repository has been modified.

18. The computing system of claim 17, wherein the one or more parameters comprises an indication of a user identifier and a storage location in the first data repository for the data.

19. The computing system of claim 18, wherein the verification information comprises one or more message digests generated based on one or more cryptographic hash algorithms associated with the user identifier.

20. The computing system of claim 18, wherein:

the verification information comprises one or more keyed message digests and one or more digest keys; and the one or more digest keys are associated with the user identifier.

\* \* \* \* \*